United States Patent [19]

Frayer

[11] 3,972,235
[45] Aug. 3, 1976

[54] SYSTEM FOR DETERMINING THE AMOUNT OF LIQUID IN A TANK OR SERIES OF TANKS

[76] Inventor: David A. Frayer, 24250 Lake Shore Blvd., Euclid, Ohio 44123

[22] Filed: Feb. 13, 1973

[21] Appl. No.: 332,086

[52] U.S. Cl. .................................. 73/311; 73/313
[51] Int. Cl.² ........................................ G01F 23/06
[58] Field of Search ............. 340/182; 73/311, 308, 73/313; 338/33

[56] References Cited
UNITED STATES PATENTS

| | | | |
|---|---|---|---|
| 1,837,113 | 12/1931 | Cheney | 340/182 |
| 1,856,364 | 5/1932 | Watson | 73/313 |
| 2,289,202 | 7/1942 | McCoy | 73/313 |
| 2,735,302 | 2/1956 | Saylor | 73/313 |
| 3,113,282 | 12/1963 | Coleman | 73/313 X |
| 3,208,281 | 9/1965 | Kalmus et al. | 73/313 |

OTHER PUBLICATIONS

Publ. "The Measurement of Electrical Quantities" by Clement & Johnston Electrical Engr. Science, pp. 214-215, 1960.

Primary Examiner—R. C. Queisser
Assistant Examiner—Daniel M. Yasich

[57] ABSTRACT

A system including a source of electrical energy, a transformer, a plurality of submerged tanks, each having a perforated container therein, a first multiple switch electrically connected to the transformer, a plurality of conductors, each selectively leading from the first multiple switch to a first conductor in each perforated container in each tank, a second electrical conductor arranged in each perforated container in each tank, a float formed of insulating material arranged in each perforated container in each tank which float is guided vertically by the conductors in the perforated container and each of which has an electrical contact secured to its upper portion which engages the conductors in each perforated container, an electrical conductor connected to the second conductor in each perforated container, each of which leads to a second multiple switch and each of which is capable of being selectively connected by the second multiple switch to the coil of a galvanometer which moves a pointer connected therewith over its scale, the conductors above the liquid in each tank regulating by their electrical resistance the amount of current flowing through the coil of the galvanometer. When the source of electrical energy is alternating current, the rectifier may be arranged between the transformer and first switch or between the second conductor and the coil of the galvanometer and when a direct current is the source of electrical energy, the rectifier may be entirely omitted.

2 Claims, 7 Drawing Figures

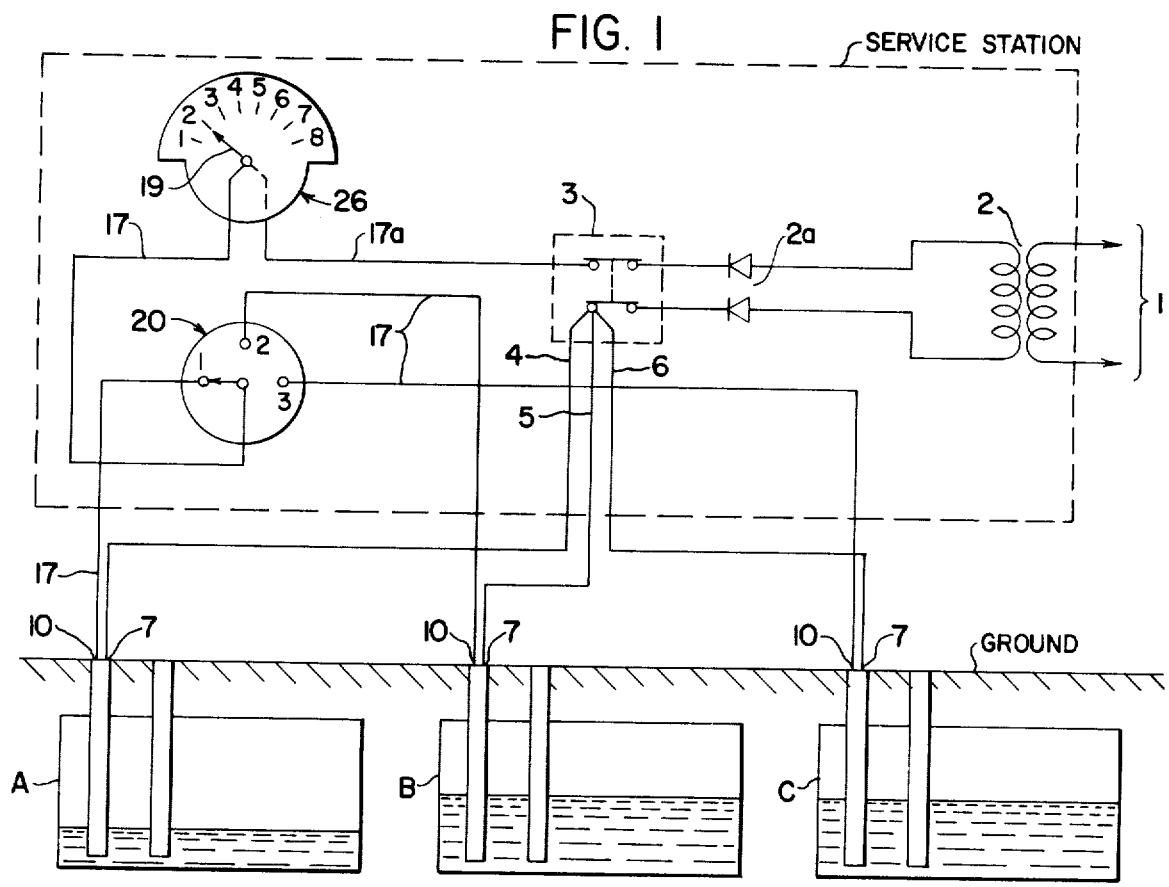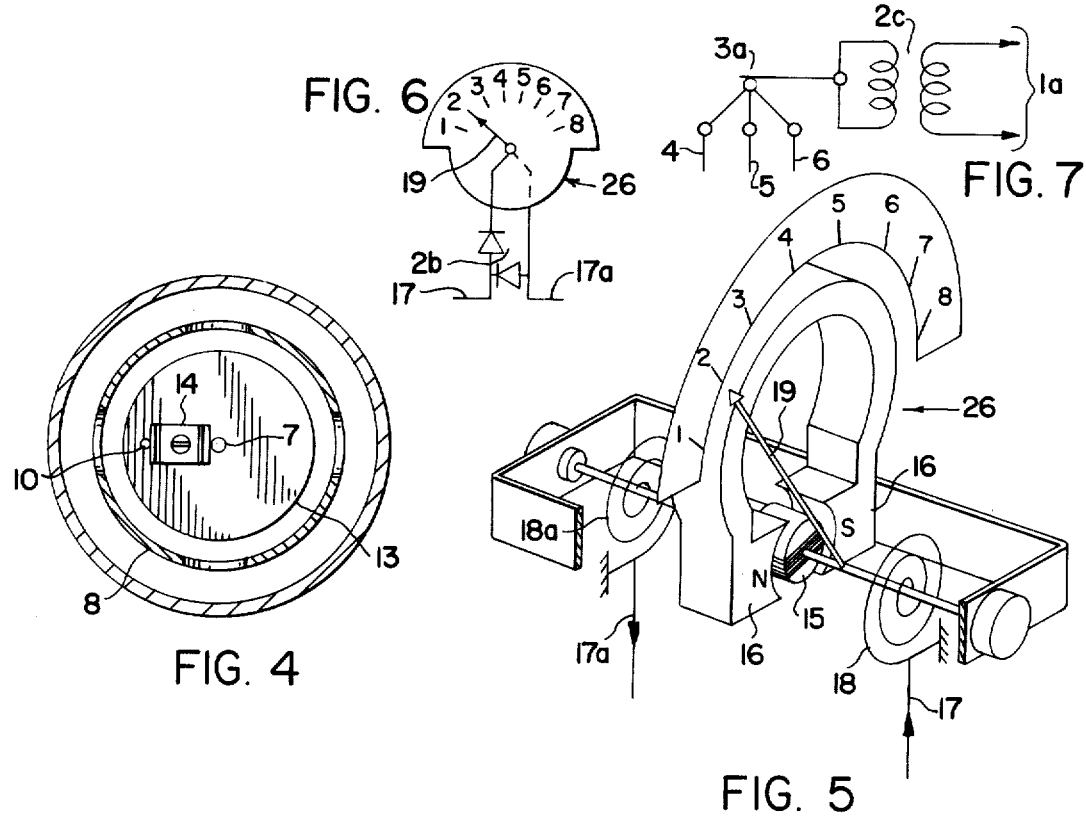

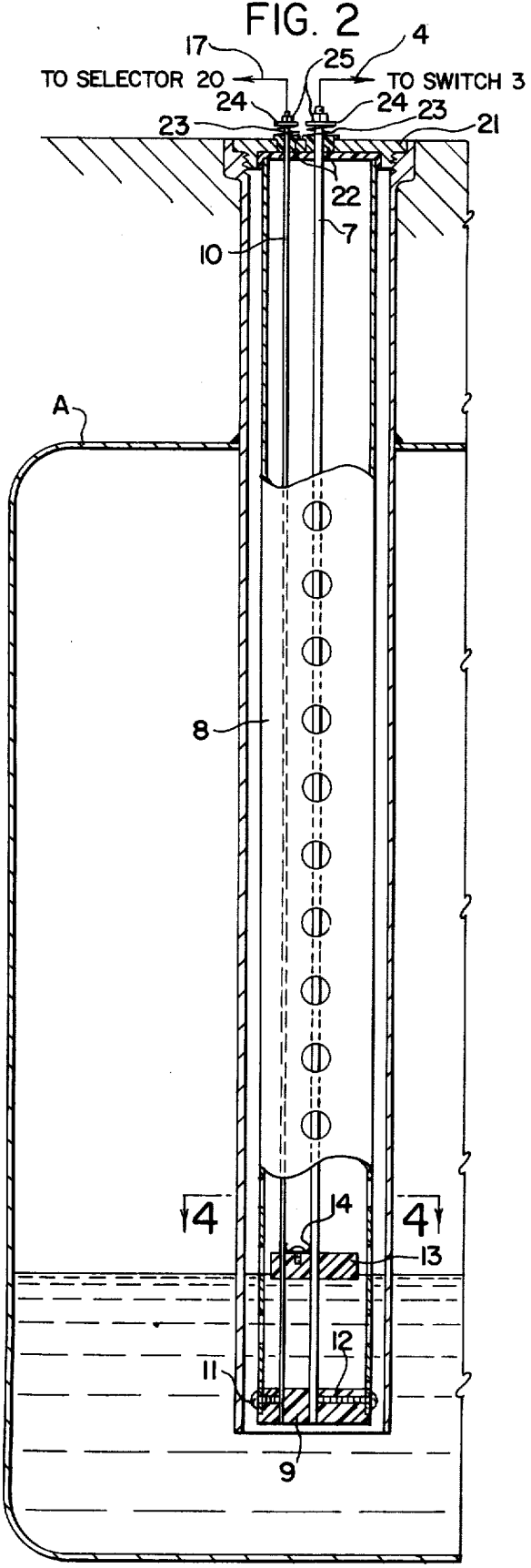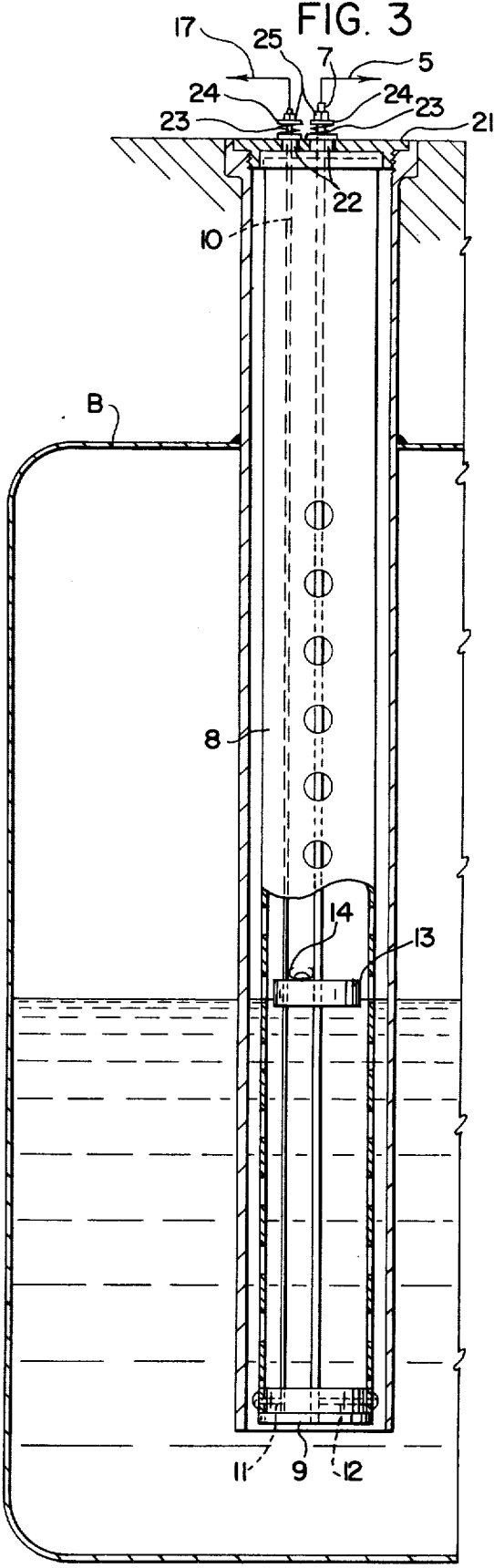

SYSTEM FOR DETERMINING THE AMOUNT OF LIQUID IN A TANK OR SERIES OF TANKS

My invention relates to a system for determining the amount of liquid within a tank by instruments located in an office, thereby eliminating the use of one or more measuring sticks. More particularly, it relates to a system for determining the amount of gasoline in each of a plurality of tanks at a service station.

In service stations as now constructed, it is the practice to provide a plurality of tanks, each of which is submerged below the ground in proximity to each of the pumps. During the usual service, the amount of gasoline that is removed from each of the tanks is not computed and when the truck carrying the usual supply of gasoline to the service station for replenishing the gasoline in the tanks makes its rounds, it is necessary to measure the amount of gasoline in each tank. For this purpose, it is the practice at the present time to remove the cover from one of the openings in each tank and to use a measuring stick of the requisite length to reach the level of the gasoline in each tank. In extremely cold weather and particularly when the wind is blowing, this task is not only time consuming but is disagreeable.

In accordance with the present invention, I have provided a system by means of which the quantity of liquid in each tank may be determined by inspecting instruments arranged in the office or hung on the wall thereof, thus avoiding the use of the measuring sticks.

My invention will be better understood by reference to the accompanying drawings in which:

FIG. 1 is a diagrammatic view of instruments arranged within the office at the station which as shown are arranged within the spaced lines and which also includes a diagrammatic view of a series of tanks submerged below the ground for holding a liquid;

FIGS. 2 and 3 are detail views of the tanks with portions in section and partly broken away; FIG. 4 is a cross sectional view taken on the line 4—4 of FIG. 2 looking in the direction of the arrows;

FIG. 5 is an enlarged view of a galvanometer that may be used in my improved system;

FIG. 6 is a detail view showing a rectifier arranged between the conductor leading from the second switch and the coil of the galvanometer; and FIG. 7 is a view of a direct current source of energy and a voltage reducing transformer arranged to make electrical contact with any one of a series of conductors leading to the respective first conductors in each of the perforated containers.

In accordance with my invention a system is provided by means of which the quantity of liquid in any one of the tanks arranged at the service station may be ascertained by inspection of a galvanometer which may be located in the office. As illustrated in the drawings, my improved system includes a source of electrical energy, such as a 110 volt alternating current line 1, a step down transformer or voltage reducer 2, two rectifiers 2a, a switch 3 which is designed to establish a circuit from the rectifier 2a through any one of the conductors 4, 5 and 6 to a conductor 7 extending vertically downwardly in a perforated container 8 in each tank which tanks have been designated by the letters A, B and C. While the number of tanks at each service station may be widely varied, for purposes of illustration, three such tanks are shown, and means associated with the perforated container in each tank and a galvanometer which may be arranged within the office are provided to determine at any time the quantity of liquid which is present in each tank. For this purpose, the container 8 in each tank which may be formed of any desirable metal, such as aluminum, has perforations therein through which a liquid, such as gasoline, may flow from the tank. The container 8 in each tank, terminates a short distance above the bottom of the tank and its bottom portion is plugged by a closure insoluble in gasoline, such as wood or rubber.

In addition to the conductor 7 which has its lower end embedded in the insulating bottom plug, each perforated container has a second vertically extending conductor 10, the lower end portion of which is embedded in the insulating plug 9 and is electrically connected to a conductor leading to the galvanometer. The lower portions of conductors 10 and 7 may be inserted through openings in the plug and held in place by screws 11 and 12 and form a guide for a float 13 composed of an electrical insulating material, such as nylon, which floats upon the liquid in the perforated container, and a spring connector 14 formed of electrical conductive material, such as copper, is secured to the float by suitable means, such as a screw between the conductors and its opposite arms are secured to or bear against and make electrical contact with the conductors 10 and 7. Conductors 10 and 7 are each formed of a wire having a comparatively small diameter which therefore has a comparatively high electrical resistance and consequently the amount of current passing to the galvanometer will be low. If the amount of current passing to the galvanometer is too high, it will be understood that a shunt may be provided so that the amount of current passing to the galvanometer may be low, such as a fraction of the amount passing through the conductors. Switch 3 is so designed that each of the conductors 4, 5 and 6 may be electrically connected to the conductor 7 of a selected container within the respective tanks.

While I do not desire to be limited to any particular galvanometer, I preferably use a D'Arsonval Galvanometer as disclosed on page 210 of Electrical Engineering Science by Clement and Johnson published by McGraw-Hill Book Company, Inc., New York, Toronto and London, in 1960 which is based upon the principle of a coil turning in a magnetic field.

As shown in the drawings a coil of fine wire is applied to an iron core or it may be wound on a bobbin which may be formed of fibre or aluminum in which case an iron core is arranged within the bobbin. As shown in FIG. 5, the coil is wound around iron core 15 and is rotatably suspended by a phosphor-bronze filament in a permanent magnetic field 16. Current from conductor 17 after passing through a switch 20 is passed to the upper portion of the coil through the phosphor-bronze wire or it may be passed through a spring 18 and the current from the opposite end of the coil is passed through the spring 18a and the conductor 17a to the voltage rectifier 2a. Current passing through the coil causes a clockwise movement of the pointer 19 of the galvanometer in accordance with the total electrical resistance of the conductors above the liquid in each perforated container. When the current passing through the fine wire forming the coil is interrupted, however, the pointer is restored to its original position by the phosphor-bronze lead-in wire or by the spring 18. It will of course be understood that the scale is arranged and the galvanometer is so calibrated that when the pointer comes to rest on a digit or between digits on the scale, such as between digits 2 and 3, it will indicate that the tank contains at least 2000 gallons or more of gasoline and if the tank has a capacity of 8000 gallons, 6000 or between 5 and 6 thousand gallons of gasoline are required to fill it depending on the distance that the pointer passes beyond digit 2 on the scale.

As shown in the drawings, each of the conductors 10 lead from a perforated container through a conductor 17 to a switch 20 at which place a selected conductor leads from switch 20 to one end of the coil of the galvanometer. As shown in the drawings, each of the conductors 7 and 10 is threaded at its upper end and each extends through an aperture in an insulated portion of the cover 21 which cover is threaded into an opening in the tank. A bushing 22, a compression spring 23, a washer 24, and a nut 25 is then applied to hold the conductors leading from switch 3 into contact with conductor 7 and the conductor 17 leading from the conductor 10 to the switch 20. As shown in the drawings the arrows 4 and 5 in FIGS. 2 and 3 indicate that the conductors 4 and 5 are electrically connected to the conductor 7 and the arrows 17 indicate that the conductors 17 are electrically connected to the conductors 10. Preferably the conductors 4 and 5 and 17 are arranged between the washers 24 and the nuts 25, respectively.

Assuming that a second tank as indicated in FIG. 3 contains 4000 gallons of gasoline, the electrical resistance of the conductors 7 and 10 above the float will be less than in the first tank and consequently the current passing to the coil of the galvanometer will be greater than the current from the first tank which will cause the pointer 19 to advance on the scale a greater distance, such as to the digit 4, thereby indicating that it would require 4000 gallons of gasoline to fill the tank. When still more gasoline is in the tank, such as 6000 gallons, it will of course be understood that the portions of the conductors 7 and 10 above the float will have less total electrical resistance than in tank 3 and the amount of current passing to the coil of the galvanometer will be higher than in tank 3 and the pointer 19 will be deflected to digit 6, indicating that it would require 2000 more gallons of gasoline to fill it. It will of course be understood that the total electrical resistance of the conductors 7 and 10 above the float may be such that the scale will indicate that it will require various amounts, such as 3 or 5 thousand gallons or a fraction thereof to fill it.

In the event that the electrical energy at the station is of the alternating current type, the current after passing through the stepped down transformer, may be rectified as diagrammatically indicated by the rectifiers 2a or after passing through the perforated container in each tank and the switch 20 shown in FIG. 6 may be rectified before being passed through the coil of the galvanometer as indicated diagrammatically by the rectifiers 2b. A diagram showing such a rectifying apparatus applied to a galvanometer is shown in FIG. 6.16 as disclosed on page 214 of the treatise by Clement and Johnson, previously referred to. It will of course be understood that if the source of electrical energy at the station is of the direct current type, the rectifier may be entirely omitted in which case current from the stepped-down transformer may be applied to each of the conductors and after passing through the coil of the galvanometer is passed directly to the step-down transformer. This form of the invention is shown in FIG. 7 in which the source of electrical energy is of the direct current type designated by the numeral 1a, the numeral 2c indicating a reducing transformer the secondary of which is connected to the switch 3a which in turn is selectively connected to any one of the conductors 4, 5 or 6 to the first conductor 7 in any one of the perforated containers as indicated by the numerals 4, 5 and 6 in FIG. 1 of the drawing and after passing through the coil of the galvanometer is connected to the secondary of the reducing transformer 2c.

What is claimed is:

1. In a system including a source of electrical energy of the direct current type, a voltage reducing transformer, and a galvanometer provided with a scale, a permanent magnetic field, a rotatable electrical filament carrying a pointer which passes over said scale, and an iron core having a fine wire winding arranged in said magnetic field, said system also including a series of tanks, each containing a liquid and within each of which is a vertical container having a lower perforated portion for receiving liquid from the respective tank into which it extends, a closure for the lower end portion of each of said perforated containers and first and second electrical conductors, each having a comparatively high electrical resistance, arranged in each of said containers and having their lower ends embedded and fixed in spaced relation in the closure of that container, a first multiple switch, electrically conductive means leading from said switch to each of said first conductors in each of said perforated containers, said voltage reducing transformer being arranged between and electrically connected to the source of electrical energy and to the first multiple switch, a float movable on the liquid in each perforated container through which float said first and second electrical conductors extend for guiding the movement of said float, electrically conductive means carried by the upper surface of each float which is arranged in electrical contact with the first and second conductors at a short distance above the liquid therein, a second multiple switch, a plurality of third electrical conductors, each of which is selectively connected to the upper end of the second conductor in each of the perforated containers and each of the third electrical conductors being electrically connected from the second multiple switch to the coil of said galvanometer which coil when energized is rotatable in a clockwise direction to rotate said pointer in a like direction over said scale, electrically conductive means selectively connected from the upper end of the second conductor of each of the perforated containers for energizing said coil and the total electrical resistance of the first and second conductors above the liquid in each of the perforated containers being such that the position of said pointer on said scale for each tank designates the amount of liquid in thousands of gallons in that particular tank.

2. A system including a source of electrical energy of the alternating current type, a series of tanks, each containing a liquid and within each of which is arranged a vertical container having a lower perforated portion for receiving liquid from the respective tank into which it extends, an insulating closure for the lower end portion of each container and first and second electrical conductors, each having a comparatively high electrical resistance, arranged in each of said containers and having their lower end portions embedded in the closure of that container and fixed in spaced relation to each other, a first multiple switch, electrical conductive means leading from said switch to each of the first conductors in each of said containers, a voltage reducing transformer arranged between and electrically connected to the source of electrical energy and the first multiple switch for selectively energizing the conductors leading from the first multiple switch to the first conductor in each of the perforated containers, a float movable on the liquid in each of the perforated containers through which float in each of said perforated containers said first and second conductors extend for guiding the movement of said float, electrical conductive means carried by the upper surface of each of said floats arranged in electrical contact with the first and second conductors in each perforated container, a galvanometer provided with a scale and a permanent magnetic field, a rotatable electrical filament carrying a pointer which passes over said scale and an iron core provided with a fine coil winding of electrically conductive wire thereon which is arranged in said magnetic field and which when energized is rotatable over said scale, a second multiple switch, a plurality of third electrical conductors, each of which is electrically connected to the upper end of the respective second conductors in each of the perforated containers and all the third electrical conductors being selectively connected from the second multiple switch to the coil of said galvanometer, and a pair of rectifiers arranged between said second multiple switch and the conductor leading to the rotatable coil of the galvanometer from the second multiple switch from the alternating current type to the direct current type to move said pointer over said scale a sufficient distance to indicate the amount of liquid in thousands of gallons in each respective tank.

* * * * *